United States Patent Office 3,833,637
Patented Sept. 3, 1974

3,833,637
PREPARATION OF UNSATURATED NITRILES
Raymond L. Cobb, Bartlesville, Okla., assignor to
Phillips Petroleum Company
No Drawing. Filed Nov. 22, 1971, Ser. No. 201,192
Int. Cl. C07c 121/30, 121/48, 121/72
U.S. Cl. 260—465 K                     6 Claims

ABSTRACT OF THE DISCLOSURE

Condensation of aldehydes with alkyl nitriles over a basic catalyst yields alpha,beta-unsaturated nitriles. In one embodiment, acetonitrile reacted with either acetaldehyde or benzaldehyde in the presence of a catalyst comprising a basic inorganic compound yielded, respectively, crotonitrile and cinnamonitrile. The product nitriles are chemical intermediates to acids, amides or amines.

---

This invention relates to the production of unsaturated nitriles. In accordance with another aspect, this invention relates to the base catalyzed condensation of alkyl nitriles with aldehydes to yield alpha,beta-unsaturated nitriles. In accordance with another aspect, this invention relates to the use of a catalyst comprising a basic inorganic compound for the condensation of alkyl nitriles with aldehydes to yield alpha,beta-unsaturated ntiriles. In accordance with a further aspect, this invention relates to the production of crotonitrile by the condensation of acetaldehyde with acetonitrile in the presence of a basic catalyst. In accordance with another aspect, this invention relates to the production of cinnamonitrile by the base catalyzed condensation of benzaldehyde with acetonitrile.

Accordingly, an object of this invention is to provide an improved process for the production of alpha,beta-unsaturated nitriles.

A further object of this invention is to provide an improved catalyst for condensation reactions.

A further object of this invention is to provide a commercially feasible process for the production of alpha,beta-unsaturated nitriles by a base catalyzed condensation reaction.

Other objects and aspects as well as the several advantages of the invention will be apparent to those skilled in the art on reading the specification and the appended claims.

In accordance with the invention, condensation of aldehydes with nitriles over a basic catalyst gives unsaturated nitriles at high conversion and high selectivity.

In accordance with a specific embodiment of the invention, alpha,beta-unsaturated nitriles are prepared by the base catalyzed condensattion of alkyl nitriles with aldehydes in the presence of a catalyst comprising a basic inorganic compound.

In accordance with one specific embodiment of the invention, crotonitrile is prepared by the base catalyzed condensation of acetonitrile with acetaldehyde in the presence of a catalyst comprising a basic inorganic compound.

In accordance with another specific embodiment of the invention, cis- and trans-cinnamonitriles are prepared by the base catalyzed condensation of acetonitrile with benzaldehyde in the presence of a catalyst comprising a basic inorganic compound.

The alkyl nitriles that can be employed according to the invention have the formula $R-CH_2-C \equiv N$ wherein R is hydrogen, an alkyl having from 1 to 18 carbon atoms, aralkyl having from 7 to 12 carbon atoms, or a cycloalkyl radical having from 5 to 12 carbon atoms, inclusive.

Representative examples of suitable alkyl nitriles that can be employed according to the invention include acetonitrile, propionitrile, heptanonitrile, tridecanenitrile, eicosanenitrile, 4-phenylbutyronitrile, 3 - phenylpropionitrile, 4-beta-naphthylbutyronitrile, 5-p-tolylvaleronitrile, cyclopentylacetonitrile, 3-(4-n-propylcyclohexyl)acetonitrile, 4-bicyclohexylacetonitrile, cyclooctylacetonitrile, and the like.

The aldehydes that can be employed according to the invention have the formula

wherein R is an alkyl having from 1 to 18 carbon atoms, aryl having from 6 to 12 carbon atoms, aralkyl having from 7 to 12 carbon atoms, or cycloalkyl having from 5 to 12, inclusive, carbon atoms.

Representative examples of suitable aldehydes that can be employed according to the invention include acetaldehyde, benzaldehyde, n-hexananl, n-decanal, n-nonadecanal, 4-biphenylcarboxaldehyde, beta-naphthaldehyde, alpha-napththaldehyde, beta - phenylpropionaldehyde, 4-phenylbutanal, phenylacetaldehyde, 3-(beta - naphthyl) porpanal, cyclopentanecarboxaldehyde, cyclohexanecarboxaldehyde, cycloheptanecarboxaldehyde, 4-bicyclohexylcarboxaldehyde, and the like.

The basic catalysts that can be employed according to the invention are selected from oxides, hydroxides and salts of Group Ia, IIa and IIb metals. The catalyst can be a single component such as magnesium silicate or an impregnated support such as potassium hydroxide deposited on magnesium silicate. Suitable metallic salt catalysts include the silicates, phosphates, borates, aluminates, and mixtures thereof containing Group Ia, IIa or IIb metals. Other supports that can be employed in addition to magnesium silicate include alumina, silica, molecular sieves, magnesium oxide, kieselguhr, charcoal, asbestos, calcium carbonate, calcium oxide, and the like, and mixtures thereof. In the event that a support is used, the amount of Group Ia, IIa or IIb metal compound employed will ordinarily be in the range of 0.1 to 20 weight percent of the support.

The various catalysts employed in this invention can be prepared by conventional procedures and in many instances will be available commercially. For example, potassium hydroxide can be deposited on the support from an aqueous solution, followed by drying and calcining of the impregnated support. Another suitable method is by dry mixing the desired support and promoting components, followed by pelletizing and calcining. If desired, a catalyst support such as silica, or silica-alumina, can be prepared in gel form, this gel impregnated when the desired promoters, the impregnated support formed into a suitable shape, and the resulting product heated or calcined to activate. Suitable catalysts can also be prepared by coprecipitation of the support and promoting agents, followed by drying, forming, and heating. The heating or calcining is normally carried out at 800 to 1200° F., although temperatures outside this range can also be used. The catalyst should be protected from any liquids or gaseous materials which would tend to deactivate it during preparation, activation or storage.

In carrying out the process of the present invention, the aldehydes are generally employed in the range 1–50, preferably 5–10, weight percent based on a total feed of aldehyde plus alkyl nitrile.

The temperature at which the process of the present invention is operated generally are within the range 150–750° C., preferably 200–600° C.

The pressure at which the process of the present invention is operated may be varied over wide ranges. The pressure can be subatmospheric, atmospheric or superatmospheric. Most often, the pressure at which the process of the present invention is operated will be within the range of 0–5000 p.s.i.g., preferably 50–500 p.s.i.g.

In operating the present process, the contact time of the alkyl nitrile and aldehyde with the basic catalyst in the reaction zone will vary appreciably, but ordinarily the weight hourly space velocity will be in the range 0.01–2, preferably 0.1–0.5 (WHSV). The optimum residence time will vary according to temperatures, lower residence time being used with higher temperatures and, conversely, longer residence times being used with lower temperatures.

In carrying out the process of the present invention, it is often desirable to carry out the reaction of the alkyl nitrile with the aldehyde in the presence of a diluent. Such diluent is inert to the chemical reaction taking place within the reaction zone. Exemplary materials which can be used as diluents are tetrahydrofuran, cyclohexane, hexane, pyridine, triethylamine, dioxane, diglyme, glyme, and the like, and mixtures thereof.

The process of the present invention can be carried out in a conventional stainless steel reactor. Additionally, the process can be carried out either continuously or on a batch basis. The process of the invention can be carried out under either liquid phase or vapor phase reaction conditions.

The alpha,beta-unsaturated nitriles produced according to the invention have utility as chemical intermediates to acids, amides or amines. For example, the product unsaturated nitriles can be hydrogenated to produce amines as is well known in the art.

In order to further describe, as well as to demonstrate, the present invention, the following examples are presented. These examples are in no manner to be construed as limiting the present invention.

EXAMPLE I

A mixture of acetonitrile and acetaldehyde was passed through a catalyst bed at a pressure of 100 p.s.i.g. at a temperature of 440° C. and at a weight hourly space velocity of about 0.2–0.3. The feed mixture comprised about 10 weight percent acetaldehyde in acetonitrile. The catalyst consisted of potassium hydroxide supported on magnesium silicate and was prepared by contacting magnesium silicate with a methanolic solution of potassium hydroxide. After stripping off the methanol, the base treated magnesium silicate was dried and used.

The above condensation gave by gas-liquid chromatography 80–90 percent (aldehyde) conversions and 65–75 percent selectivity to crotonitrile. Heavies amounted to no more than 10–15 weight percent.

It was found in carrying out the above condensation using the potassium hydroxide on magnesium silicate catalyst that (a) by-product crotonaldehyde increases with increasing concentration of aldehyde in acetonitrile, (b) less crotonitrile and more by-products are produced by increasing contact time by decreasing WHSV, increasing pressure, or decreasing inert gas flow, and (c) the optimum temperature range for the condensation is about 400–450° C.

EXAMPLE II

A mixture of benzaldehyde with acetonitrile was passed through a catalyst bed at a pressure of 1400 p.s.i.g. at a temperature range of 250–260° C. and at a weight hourly space velocity of about 0.8. The catalyst was a commercial catalyst containing 3 percent potassium hydroxide, 5 percent barium hydroxide, 3 percent magnesium oxide, and 89 percent alumina, all on a weight basis. The run was carried out for a period of 7½ hours. The feed mixture comprised 10 weight percent benzaldehyde in acetonitrile-tetrahydrofuran (8:1).

In the above condensation of acetonitrile with benzaldehyde it was found that the benzaldehyde conversions were 70 percent initially, decreasing to about 30 percent at the end of 7½ hours to give isolated (distilled) yields of 9 percent and 37 percent, respectively, of cis- and trans-cinnamonitriles. Heavies amounted to about 30 weight percent for a material balance of about 80 percent.

The product unsaturated nitriles were catalytically hydrogenated to yield substantially only 3-phenylpropylamine.

I claim:
1. A process for the preparation of alpha,beta-unsaturated nitriles which comprises contacting at a temperature within the range 150–750° C.
   (1) nitriles having the formula R—CH$_2$—C≡N wherein R is hydrogen, an alkyl having from 1 to 18 carbon atoms, aralkyl having from 7 to 12 carbon atoms, or a cycloalkyl radical having from 5 to 12 carbon atoms, inclusive,
with
   (2) aldehydes having the formula

wherein R is an alkyl having from 1 to 18 carbon atoms, aryl having from 6 to 12 carbon atoms, aralkyl having from 7 to 12 carbon atoms, or cycloalkyl having from 5 to 12, inclusive, carbon atoms in amounts of aldehydes ranging from 1–50 weight percent based on total weight of aldehydes plus nitriles in the presence of
   (3) a catalyst consisting of (a) potassium hydroxide and magnesium silicate or (b) potassium hydroxide, barium hydroxide, magnesium oxide, and alumina.

2. A process according to claim 1 wherein the contacting is carried out at a temperature in the range 200–600° C., a pressure in the range 0–5,000 p.s.i.g. and a weight hourly space velocity of the feed reactants in the range 0.01–2.

3. A process according to claim 1 for the preparation of crotonitrile which comprises contacting acetonitrile with acetaldehyde in the presence of a catalyst consisting of potassium hydroxide and magnesium silicate.

4. A process for the preparation of cis,trans-cinnamonitriles according to claim 1 which comprises contacting acetonitrile with benzaldehyde in the presence of a catalyst consisting of potassium hydroxide, barium hydroxide, magnesium oxide, and alumina.

5. A process according to claim 3 wherein the feed mixture for said contacting comprises about 10 weight percent acetaldehyde in acetonitrile and said contacting is effected at a temperature in the range of about 400–450° C.

6. A process according to claim 4 wherein the feed mixture for said contacting comprises about 10 weight percent benzaldehyde in acetonitrile and tetrahydrofuran as diluent and said contacting is effected at a temperature in the range of about 250–260° C.

References Cited

UNITED STATES PATENTS

| | | | |
|---|---|---|---|
| 2,478,990 | 8/1949 | Walker | 260—465 |
| 3,574,703 | 4/1971 | Hagemeyer, Jr., et al. | 260—465.9 |
| 3,578,702 | 5/1971 | Snapp, Jr., et al. | 260—465.9 X |

LEWIS GOTTS, Primary Examiner

D. H. TORRENCE, Assistant Examiner

U.S. Cl. X.R.

260—464, 465.9